Aug. 17, 1943.  W. R. BREND  2,326,822
PIPE LINING APPARATUS
Filed July 1, 1941  5 Sheets-Sheet 2

INVENTOR.
WILLIAM R. BREND
BY Cooper Kerr + Dunham
ATTORNEYS

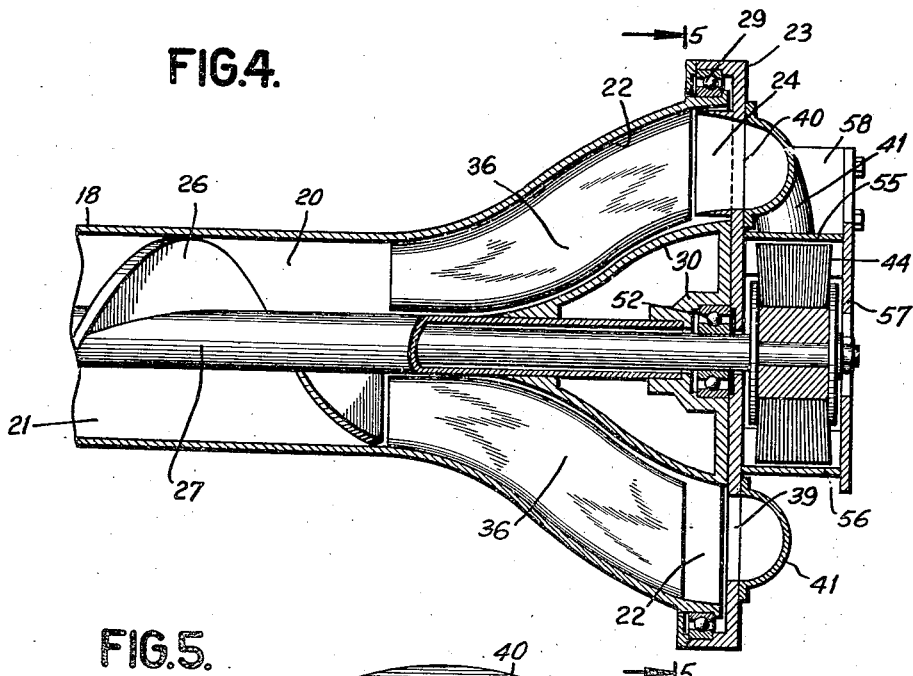
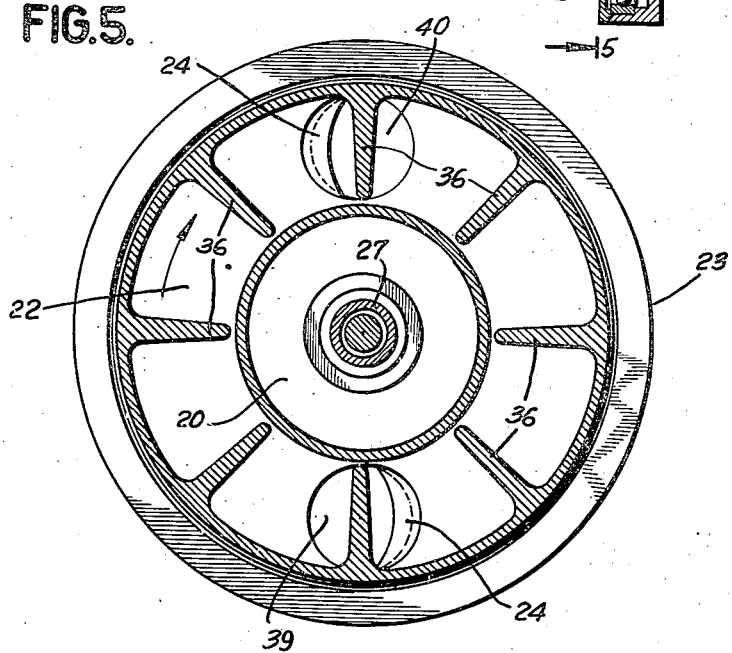

Aug. 17, 1943.   W. R. BREND   2,326,822
PIPE LINING APPARATUS
Filed July 1, 1941    5 Sheets-Sheet 5

INVENTOR
WILLIAM R. BREND
BY
ATTORNEYS

Patented Aug. 17, 1943

2,326,822

UNITED STATES PATENT OFFICE 2,326,822

PIPE LINING APPARATUS

William R. Brend, East Orange, N. J., assignor to Lock Joint Pipe Company, East Orange, N. J., a corporation of New Jersey Application July 1, 1941, Serial No. 400,635

8 Claims. (Cl. 91—44)

This invention relates to apparatus for lining pipe.

It is among the objects of the invention to provide apparatus for applying a lining of concrete or of other plastic material to the interior of a pipe by which a lining of high density and uniform thickness may be assured.

Another object is to provide mechanism for controlling the speed of traverse of a stream of plastic material about a circular path so that a given section of pipe can have a lining applied throughout its circumference during any one of several different periods of time depending upon the speed of traverse of the stream selected.

Another object is to provide mechanism for enabling ready adjustment of the cross-sectional area of the stream of plastic material which is projected by a rotary brush.

Further and other objects of the present invention will be hereinafter set forth in the accompanying specification and claims and demonstrated by the drawings which show by way of illustration a preferred embodiment and the principle of my invention, and what I now consider the best mode in which I have contemplated applying that principle. Other embodiments of the invention employing the same principle may be used and structural changes made as desired by those skilled in the art within the spirit of the appended claims and without departing from the present invention.

In the drawings, Fig. 1 shows a side elevation of the apparatus, partly in section, and in position within a pipe.

Fig. 4 is a longitudinal section through the distributing head end of the apparatus.

Fig. 5 is a section on line 5—5 of Fig. 4.

Figure 1:
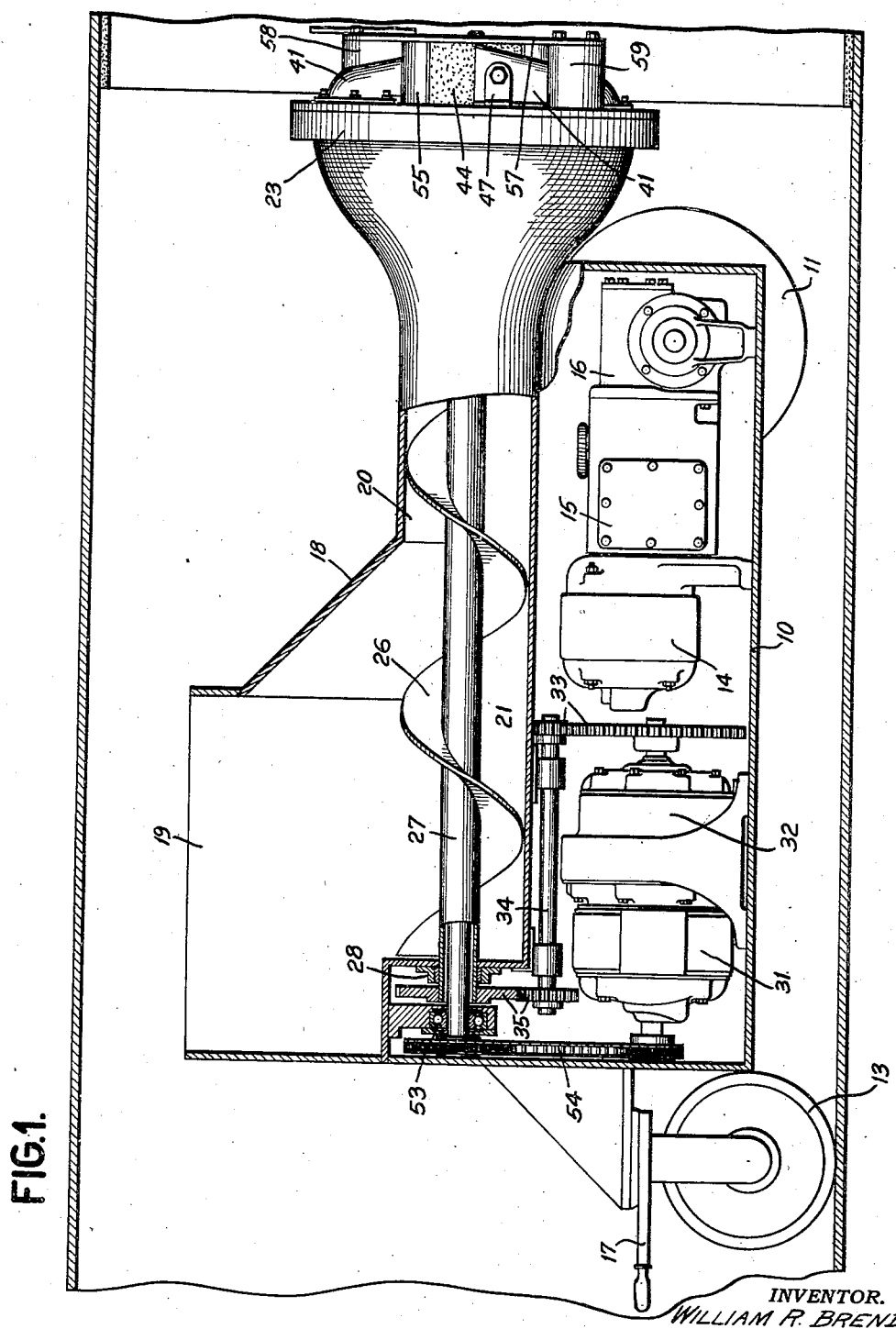

The apparatus and process of this invention is concerned primarily with lining the interior of pipes with plastic materials and particularly materials which are plastic and moldable and which subsequently harden or set in a solid mass. The apparatus is particularly suitable for applying coatings of such plastic materials as contain solid matter or aggregate such as mixtures containing sand, or other concrete materials, mixed with cement. Efficacy of the process of the apparatus resides in its capability for applying concrete at a rapid rate and under conditions which produce a well-anchored and long-wearing coating. To effect this, the apparatus is designed to project a stream of plastic material at a high velocity, with the result that the interior of a pipe, however rough, is thoroughly coated and the coating is densified through impact.

Relative motion between the apparatus and the pipe is provided so as to lay a helical winding or course of plastic material upon the interior wall of a pipe in such a manner as to form a continuous lining. In one embodiment of the invention illustrated in the drawings, the apparatus is mounted for travel through a pipe line and in another embodiment the apparatus is mounted for travel outside of a section of pipe.

As shown in Fig. 1 of the drawings, the apparatus is mounted upon a carriage 10 having a pair of traction wheels 11, 12 and a single front wheel 13. The wheels 11 and 12 are driven through suitable connection by a motor 14. A variable speed transmission 15 and a speed reduction unit 16 is provided between the motor and the traction wheels by which the speed of travel of the carriage may be controlled. The speed of travel chosen would depend upon the capacity of the ribbon or stream of material which is being applied and the thickness of the lining desired.

The front wheel 13 is a steering wheel, and a handle 17 is provided to control the direction of movement of the carriage. The carriage includes a casing 18 which comprises a hopper 19 and a tubular chamber 20 in communication with each other. The tubular chamber includes the lower rounded part of the hopper forming a trough 21 and a conveying tube which discharges into an annular passageway 22 between the conveying tube and the rotary distributing head 23, as shown in Figs. 1 and 4. The hopper 19 discharges directly into the conveying tube 20 and the material in the conveying tube is removed therefrom after it has passed through the annular chamber 22 by cup-shaped cutting edges or scoops 24 which are carried by the rotary distributing head.

The casing 18 is stationary upon the carriage and the plastic material contained therein is advanced by a worm 26 which is mounted upon a hollow shaft 27. The center of the shaft and worm is coaxial with the tubular passage 20 and is mounted in bearing 28 at the front end of the carriage. The other end of the hollow shaft is supported indirectly from casing 18 by means of a bearing 29, the rotary distributing head 23 and a conical member 30 to which the distributing head and hollow shaft are secured. It is apparent, therefore, that the hollow shaft, with its worm, the conical member 30 and the distributing head 23 all rotate together with respect to the casing 18.

As seen in Fig. 1, the drive for these elements includes a motor 31, a gear reduction unit 32, gears 33, shaft 34 and gears 35. The gears of the reduction unit and of the transmission are chosen so as to rotate the hollow shaft with its worm and distributing head at a speed which is comparatively low with respect to the rotary speed of the impelling mechanism of the apparatus. By changes in gearing different angular speeds of the distributing head may be obtained.

The material advancing through the conveying tube 20 under propulsion from the worm enters the annular passageway 22, Fig. 4. This passageway includes the space between the conical member 30 and the casing 18. A number of vanes 36 are preferably placed within this annular passageway and extend inwardly from the wall of chamber 22, as illustrated in Fig. 5. These vanes are radially disposed and they divide the annular passageway into a number of individual channels.

The distributing head includes a plate 37 having one or more openings 39, 40. Each of these openings is covered by a conduit member in the form of a horn 41 which has a flange 42 by which the horn is secured to the plate 37. Slots 43 in the flange of the horn are provided to enable adjustment of the discharge end 43 of the horn with respect to the outside surface of a rotary impelling element 44. When adjustment is made each horn is secured by screws 45. An adjusting screw 46, which is supported upon the plate by a clip 47, is provided for adjusting purposes so that the desired clearance between the discharge end of the horn and the rotary impelling element may be accurately determined. When the desired clearance is attained, the adjustment may be secured by a lock-nut 48. The cross-section of the stream delivered from the brush can be changed and the wear of the impelling element can be compensated for by suitable adjustment.

For the rotary impelling element 44, I employ a cylindrical brush preferably made of bristles consisting of metallic spring steel or other suitable spring material which is sufficiently tough to withstand attrition and at the same time provide sufficient resilience to impart high velocity to the particles of plastic material which are picked up and batted out through the discharge mouths of the horns. I have found that spring steel wire forms satisfactory bristles for use in an apparatus for applying coatings of cement or concrete.

The material-receiving end of each horn coincides with an opening (39, 40) in the plate 37. The horn is so shaped as to provide a substantially rectangular opening at the outer surface of the brush 44. This opening extends for practically the full width of the brush, Fig. 1. The material issuing from the discharge opening is directed upon the ends of the bristles of the brush by which it is carried and immediately impelled from the lip of the horn in the form of a stream.

Figure 3:
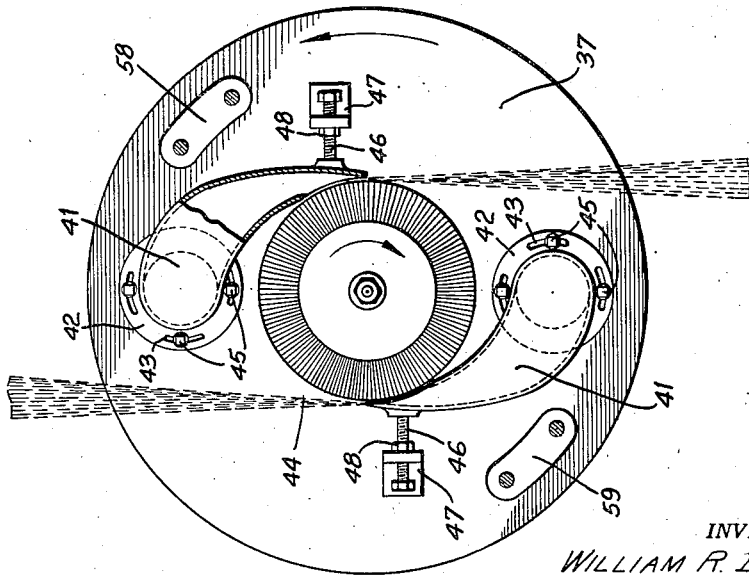
Fig. 3 shows an end view of the distributing head.

The discharge of plastic material from the rotary impelling brush 44 is in a direction substantially tangential to the periphery of the impelling brush and the relationship of the impelling brush and horn is such that the plastic material approaches the impelling brush in a direction which is constantly changing with respect to the pipe but which remains substantially coextensive with respect to its direction of projection by the impelling brush, Fig. 3.

The rotation of the distributing head is counterclockwise, as seen from the end of the apparatus, Fig. 3. As the head rotates, the scoops 24 at the following edges of the openings in plate 37 gather in plastic material from the annular passageway 22 into which they extend. The material thus scooped is directed through the horns and inwardly towards the axis of the head to positions of discharge against the cylindrical surface of the rotating brush 44. The result of the continuous rotation of the hollow shaft and distributing head is to deliver the material to the outside surface of the brush close to its points of projection at the ends of the horns, as illustrated in Fig. 3.

As illustrated in Fig. 3, the direction of rotation of the brush is clockwise, and, as the brush is travelling at a high angular velocity, it picks up the material leaving the horns and imparts sufficient energy to the particles to cause them to impact against the interior of the pipe and upon each other to form a lining.

The shaft upon which the rotary brush is carried is journalled at the brush end in bearing 52 which is supported by conical member 30. The bearing 53 at the front end of the carriage is supported from the casing 18. The shaft is driven from motor 31 through a chain and sprocket connection 54.

Figure 2:
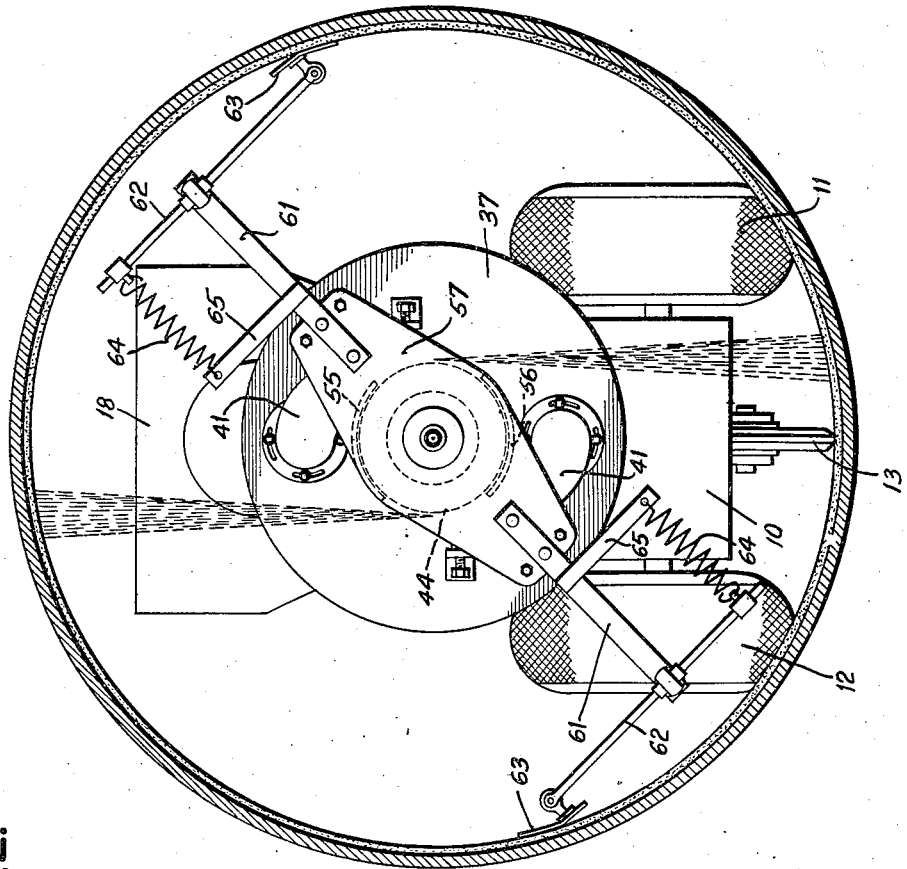
Fig. 2 is an end view of the apparatus showing the manner in which trowelling mechanism may be mounted.

In order to restrain unnecessary spattering of material from the rotating brush a pair of sector plates 55, 56 may be provided, Figs. 2 and 4. These plates are curvilinear and extend about the outside of the cylindrical surface of the brush between the discharge openings in the horns. They project from and are supported by plate 57 which is bolted to a pair of lugs 58, 59. The lugs are carried by the main plate 37 of the distributing head. Plate 57 is large enough to enclose the brush at its end.

In the present form of apparatus a pair of discharge conduits or horns is provided, with the result that there are two streams of plastic material being delivered from the brush simultaneously. The provision of two streams enables individual layers to be applied thinly and also halves the time in which a lining of a given thickness may be placed. By the addition of other discharge horns, the number of streams may be increased with a corresponding effect.

A function of plate 57 is to support and carry the trowelling mechanism which can assume any well-known form.

It is preferable that trowelling mechanism be provided for each stream of material and two are shown, Fig. 2. Each of these consists of an arm 61 bolted to plate 57. This arm carries a pivot upon which a lever 62 is mounted. One end of the lever carries a trowel member 63 which is pivoted upon the lever. The other end of the lever is secured to a spring 64 which is stretched between the lever and a fixed support 65. This spring causes the trowel to be pressed against the portion of lining material which has previously been applied to the interior of the pipe. The position of the trowelling element is such as to bear upon and smooth over the material which has been applied by the stream immediately preceding the trowel.

It is one of the advantages of the invention that the axis of the impelling member does not have to be located exactly on the axis of a pipe which is being lined. This is because of the high velocity developed in the projected material. These axes are shown as being coaxial in Figs. 1 and 2 of the drawings, but should the pipe be a little smaller or a little larger, the effectiveness of operation would not be impaired. In a smaller pipe, the axis of the impeller would be above that of the pipe so that in the lower half of circular travel of the streams of material the path of travel from the impelling point to the pipe wall would be greater than that of the streams when applying material to the upper half of the pipe. The high velocity of the moving particles tends to minimize any effect due to difference in lengths of path of travel. Accordingly, there is no need to provide for special adjustment as the same apparatus may be used to serve pipes of different diameters within limits.

Figure 6:
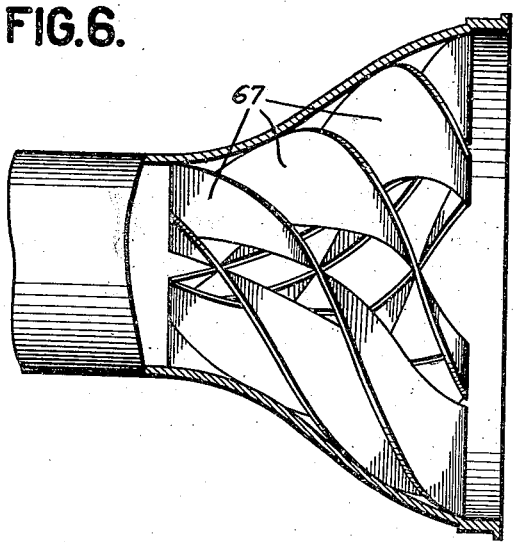
Fig. 6 illustrates a modified form of annular passageway.
Figure 7:
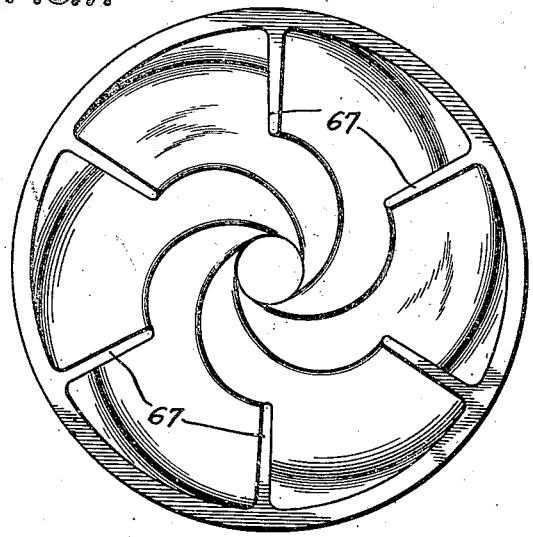
Fig. 7 is an end view of the casing shown in Fig. 6.

As I have explained in my description of the apparatus illustrated in Fig. 4, I preferably employ vanes within the annular passageway 22 to divide the material advancing through the passageway into several channels. The vanes illustrated in Figs. 4 and 5 are radially disposed. In Figs. 6 and 7 are shown a modified form of vane structure in which the vanes 67 are pitched in the direction of rotation of the hollow shaft and conical member 30. This arrangement is considered desirable in certain sizes of apparatus in order to minimize the frictional drag of the vanes upon advancing material.

Figure 8:
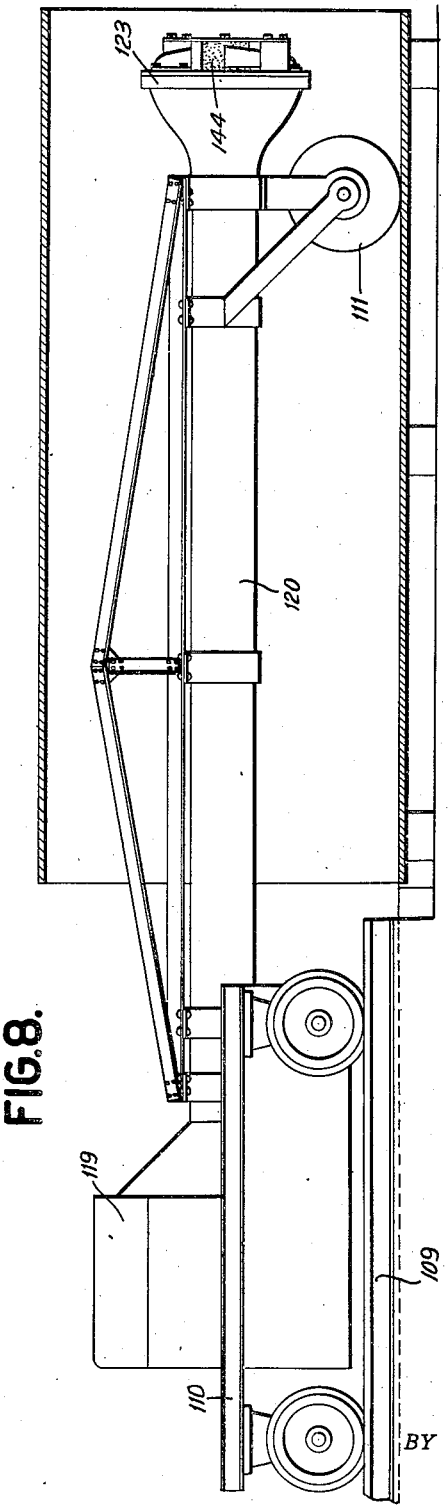
Fig. 8 is an embodiment of the invention for applying a lining to a section of pipe.

The embodiment of the invention which has been described is designed particularly for lining a pipe line. The invention has application also to apparatus for lining the interior of a section of pipe as a step in a process for manufacturing pipe. In Fig. 8, there is illustrated apparatus suitable for use at a plant where pipe is manufactured. The operating mechanism for this apparatus is the same as that previously described. It includes a conveying tube 120 which is in open communication with a casing 119 from which it receives plastic material. A distributing head 123 and rotary impelling brush 144 are located at the discharge end of the conveying tube.

The casing 119 and the front end of the tube 120 are supported upon a carriage 110 which is mounted upon track rails 109. The distributing head end of the apparatus is supported upon a single wheel 111 which bears upon the bottom of the pipe section. A truss beam provides support for the extension of the tube 120 between the carriage and the supporting wheel 111. The tracks for this apparatus are so arranged that the carriage may be moved for a distance sufficient to enable the distributing head to pass from one end of the pipe to the other.

The apparatus has been found to be effective for applying coatings of such plastic materials as contain solid matter or aggregate such as mixtures containing sand and other concrete materials mixed with cement. Coatings of sand and aggregates, such as gravel and crushed stone, mixed with cement, and coatings of cement and asbestos are also effectively applied.

The coating obtained is characterized by its density. This is because of the effects produced by the manner in which the concrete is applied. The operation of the brush maintains a uniform and steady stream of concrete which is finely divided into minute particles uniformly distributed throughout the stream. This results from the manner in which the brush picks up the concrete from a constantly advancing supply of concrete coming into contact with its rotating surface. The relatively large number of bristles in the brush provide an indefinite number of surfaces whereby small particles of the concrete are picked up and formed into a continuous stream.

What is claimed is:

1. Apparatus for applying a plastic coating to the interior of a pipe, comprising a rotatable distributing member, means for mounting said member within a pipe, means for feeding plastic material to said rotary distributing member, a rotatable brush mounted concentrically with said rotatable distributing member and having a cylindrical exterior configuration, means for rotating said brush, a conduit carried by said distributing member and having an entrance opening with an edge extending towards said feeding means for scooping material into the conduit as the distributing head is rotated and a discharge opening adjacent the ends of the bristles of the brush, said conduit being so disposed that its discharge opening feeds material to the brush through 360 degrees of travel of the conduit, and means for rotating said distributing member and conduit to cause the plastic material discharged from said conduit to be impelled by said brush towards the interior wall of the pipe in a stream which progresses around the circumference of the pipe.

2. Apparatus for applying a plastic coating to the interior of a pipe, comprising a rotatable distributing member, means for mounting said member within a pipe, means for feeding plastic material to said rotary distributing member, a rotatable brush mounted concentrically with said rotary distributing member and having a cylindrical exterior configuration, means for rotating said brush, a conduit carried by said distributing member and having a discharge opening for directing plastic material to the periphery of said rotatable brush, said conduit being so disposed that its discharge opening feeds material to the brush through 360 degrees of travel of the conduit, means for adjusting the clearance between said discharge opening and the periphery of said brush, and means for rotating said distributing member and conduit to cause the plastic material discharged from said conduit to be impelled outwardly from the axis of the distributing member in a stream which has a circular direction of travel.

3. Apparatus for applying a plastic coating to the interior of a pipe, comprising a rotatable distributing member, means for mounting said member within a pipe, means for feeding plastic material to said rotary distributing member, a rotatable brush having a cylindrical exterior configuration, said rotatable brush being carried by said mounting means and arranged concentrically with said rotary distributing member, a conduit carried by said distributing member and providing for passage of plastic material from said distributing member to said brush, said conduit having a discharge opening opposite a portion of the cylindrical exterior of said brush for feeding plastic material to the periphery of said brush, and means for rotating said brush to cause the same to remove plastic material from the opening of said conduit and impel it in a stream substantially tangential to the brush and from the location where said conduit presents its discharge opening to the brush.

4. Apparatus for applying a plastic coating to the interior of a pipe, comprising rotatable means for distributing plastic material in a circular path, said rotatable means having a delivery opening for feeding plastic material therefrom, means for feeding plastic material to said rotatable means, a rotatable brush adapted for use within a pipe and for arrangement for rotation about an axis substantially parallel to the axis of the pipe, said rotatable brush being located with a portion of its periphery intersecting the circular path of said delivery opening of said rotatable means, means for rotating said rotatable brush for directing the plastic material received thereon from said rotatable means against the wall of a pipe, and means for rotating said rotatable means so as to continuously change the direction of discharge of plastic material therefrom and from said rotary brush.

5. Apparatus for applying a plastic coating to the interior of a pipe, comprising rotatable means for distributing plastic material in a circular path, said rotatable means having a delivery opening for feeding plastic material therefrom, means for rotating said rotatable means to cause a locus of discharge of plastic material therefrom to travel through 360° of rotation of said rotatable means, a rotatable brush located with a portion of its periphery intersecting the circular path of said delivery opening of said rotatable means, said rotatable means and said rotatable brush being concentrically mounted with said brush within the circular path of delivery of plastic material from said delivery opening of said rotatable means, means for rotating said rotatable brush for directing the plastic material received thereon from said rotatable means against the wall of a pipe, and means for continuously advancing plastic material to said rotatable means and brush.

6. Apparatus for applying plastic material to the interior of a pipe comprising a casing, means for advancing plastic material through said casing, said casing having an annular passageway, a distributing head mounted for rotation upon said casing, said distributing head having a conduit in communication with said annular passageway, said conduit having an opening for the delivery of plastic material therefrom, means for rotating said distributing head and conduit, a shaft mounted for rotation independently of said distributing head, said shaft being arranged within said casing, a cylindrical brush mounted upon said shaft and positioned to receive plastic material from the conduit carried by said rotary head, and means for rotating said brush to project the plastic material received from said conduit against the interior of the pipe wall.

7. Apparatus for applying plastic material to the interior of a pipe comprising a tubular chamber, a worm mounted within said chamber for advancing plastic material therethrough, said worm being mounted upon a hollow shaft, a casing having an annular passageway connecting with the discharge end of said worm, a distributing head mounted for rotation upon said casing, said distributing head having a conduit in communication with said annular passageway, means connecting said distributing head with said hollow shaft so the same may be rotated thereby, another shaft mounted within said hollow shaft, a cylindrical brush mounted upon said shaft and located to receive plastic material from the conduit carried by said rotary head, means for rotating said worm and rotary head so as to advance plastic material through said passageway and conduit and discharge the same in a circular path about said rotary brush, said conduit having a discharge end which discharges material to the periphery of said brush through 360 degrees of revolution of the conduit, and means for rotating said brush to project the plastic material received from said conduit against the interior of the pipe wall.

8. In apparatus for applying plastic material to the interior of a pipe, the combination comprising a rotatable member for distributing plastic material in a circular path, a rotatable impelling element having a portion of its periphery located for intersecting the circular path of delivery of plastic material from said distributing member, means for rotating said rotatable impelling element for projecting plastic material received thereon from the distributing member, and means for providing plastic material to said distributing member and impelling element.

WILLIAM R. BREND.